W. H. BATES.
PNEUMATIC SUSTAINING MEANS FOR VEHICLES.
APPLICATION FILED JULY 5, 1917.

1,301,804.

Patented Apr. 29, 1919.
2 SHEETS—SHEET 1.

Witnesses

W. H. Bates Inventor
by
Attorneys

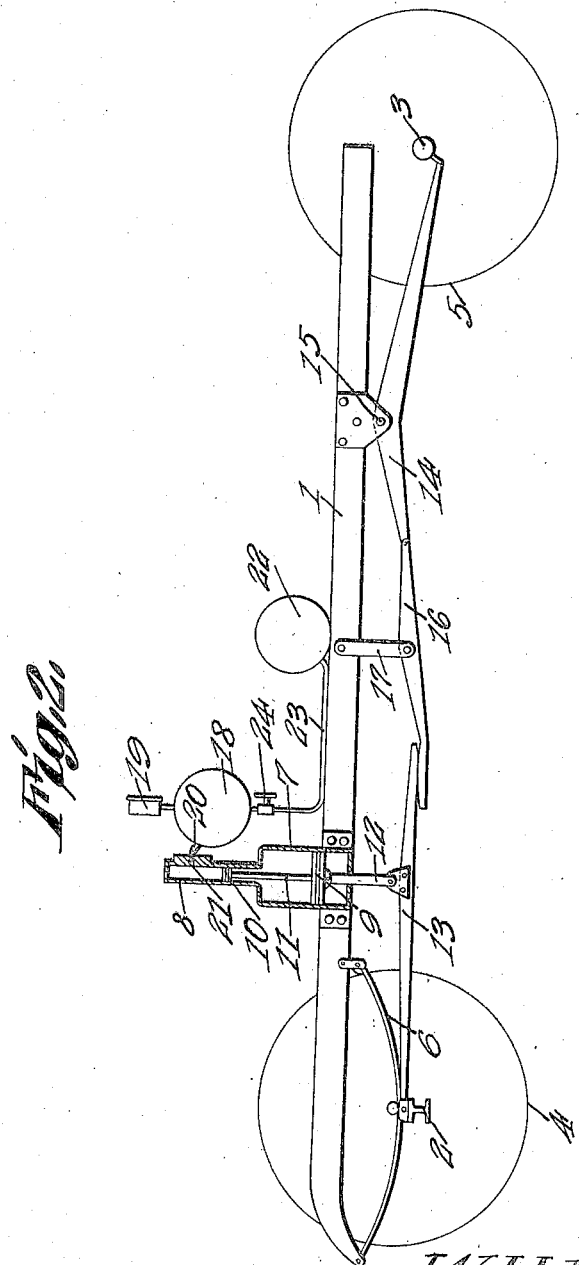

UNITED STATES PATENT OFFICE.

WILLIAM H. BATES, OF VANCOUVER, WASHINGTON.

PNEUMATIC SUSTAINING MEANS FOR VEHICLES.

1,301,804.  Specification of Letters Patent.  Patented Apr. 29, 1919.

Application filed July 5, 1917. Serial No. 178,804.

*To all whom it may concern:*

Be it known that I, WILLIAM H. BATES, a citizen of the United States, residing at Vancouver, in the county of Clarke and State of Washington, have invented a new and useful Pneumatic Sustaining Means for Vehicles, of which the following is a specification.

The present invention appertains to a pneumatic sustaining means for automobiles and other vehicles, and aims to provide a novel and improved device for pneumatically sustaining the frame and body of the vehicle upon the running gear, to absorb shocks, whereby the vehicle will ride easily over uneven roads, even though the pneumatic tires and axle springs are eliminated.

A further object of the invention is the provision of a pneumatic cushion carried by the vehicle frame or body and novel means connected to the running gear and cushion for pneumatically sustaining the frame or body for yielding movement relatively to the running gear.

It is also the object of the invention to provide a mechanism of the nature indicated, which is comparatively simple and inexpensive in construction, which can be readily installed upon various vehicles, and which will be practical and efficient in use.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawings, wherein:

Fig. 2 is a side elevation thereof.

Figure 1:
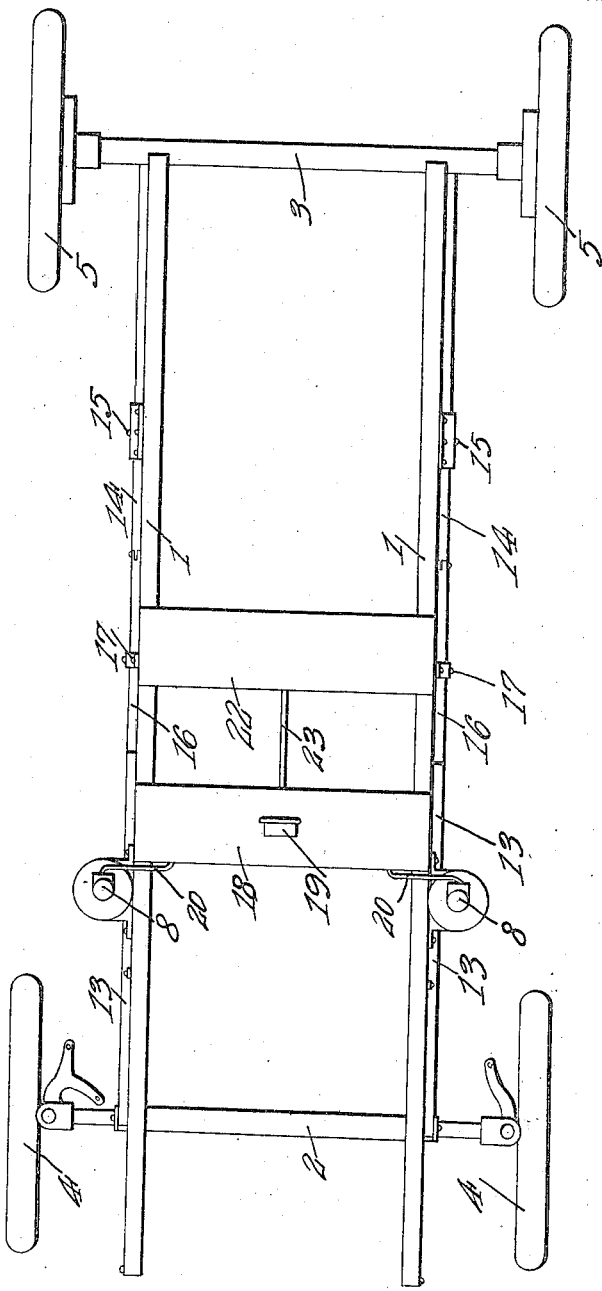
Figure 1 is a plan view of an automobile chassis showing the improvements embodied therein.

The automobile chassis illustrated in the drawings, embodies a frame 1 for supporting the body, and supported by the running gear including the front and rear axles 2 and 3, respectively, for the front and rear wheels 4 and 5, respectively. It is preferable to connect the front axle 2 with the frame 1 by one or two light springs 6, primarily to hold the frame and front axle in relative position, the ordinary springs between the axles and frame being eliminated.

In carrying out the invention, an air cushion or dash pot is used at each side of the vehicle, and embodies an upright main cylinder 7 attached to the side of the frame 1 in any suitable manner, and provided at its upper end with an upstanding secondary auxiliary cylinder 8 of smaller diameter, and having its upper end closed, while the lower end of the cylinder 7 is open. A main piston 9 is slidable within the cylinder 7, while a secondary piston 10 of smaller diameter is slidable within the cylinder 8, said pistons being connected by a piston rod 11, whereby they reciprocate as a unit. The pistons are provided with suitable packing rings to prevent leakage, and the pistons 9 are connected by links 12 with levers 13, between the ends of said levers. The forward ends of said levers are pivoted to the front axle 2 to be vibrated when the front axle and frame move relatively.

A lever 14 is fulcrumed or pivoted, as at 15, between its ends, to each side of the frame 1 near the rear end thereof, and the rear arm of the lever 14 is pivotally connected with the rear axle 3, while its forward arm is pivotally connected with the rear end arm of a floating lever 16. The floating lever 16 is pivoted between its ends to the lower end of a link hanger 17 pivoted at its upper end to the side of the frame 1, and the forward arm of the lever 16 extends under the rear arm of the lever 13. The levers provide an operative connection between the running gear, frame and pneumatic cushions or dash pots, whereby the frame is pneumatically sustained from the running gear.

A reservoir 18 for compressed air or other pressure fluid is provided on the frame at any suitable point thereof, and is provided with a pressure gage 19. The reservoir 18 is connected by means of a tube or pipe 20 with each cylinder 8, said cylinder having a port 21 communicating with the pipe 20 for the flow of pressure fluid into and out of the cylinder 8. The piston 10 is normally below the port 21, but when the piston reaches the port 21, due to the movement of the frame and running gear toward one another, the piston will cover the port 21, and stop the flow of pressure fluid therethrough.

In order to supply compressed air or other pressure fluid to the reservoir 18, there is provided a supply tank 22, air compressor, or other source of pressure fluid, which is connected by a pipe or tube 23 with the reservoir 18, said pipe having a valve 24 therein, to control the flow of pressure fluid into the reservoir 18, whereby the desired pressure can be obtained in said reservoir, under the various conditions.

In operation, under normal conditions, the pressure and expansion of the pressure fluid in the cylinders 8 and 7 will force the pistons downwardly, thereby pushing down on the links 12 and raising the frame 1 relatively to the running gear, it being noted that the ends of the levers 13 will rest upon the forward arms of the levers 16, thereby raising the rear arms of levers 16 and forward arms of levers 14, to lower the rear arms of levers 14 and consequently tending to lower the axle 3, resulting in the fulcrums 15 and rear portion of frame 1 being raised and sustained. The levers 13 in being pushed downwardly, tend to lower the axle 2, which results in the forward portion of the frame 1 being raised and sustained. Should the front wheels 4 strike an obstruction, tending to thrust them upwardly, this will raise the forward ends of levers 13, and their rear ends in bearing on the levers 16, will raise the links 12 and also the pistons, thereby compressing the pressure fluid within the cylinders, which yieldably resist such movements of the parts, and absorbs the shock. It will be noted that when the piston 10 at each side moves upwardly, it forces the fluid from the cylinder 8, above the piston 10 back into the reservoir 18, until the piston 10 reaches the port 21, which shuts off the flow of fluid, so that the compression of the fluid within the upper portion of the cylinder 8 above the piston 10 and port 21, will provide a final cushion to stop the relative movement of the frame and running gear. Furthermore, due to the fact that the cylinder 7 is of greater area than the cylinder 8, the upward movement of the piston 9 will result in the compression of the fluid within the upper portion of cylinder 7 and lower portion of the cylinder 8, the fluid being compressed faster within the cylinder 8, than it expands in the lower portion of the cylinder 8 due to the upward movement of the piston 10. A double cushioning effect is thus provided, the parts being moved back pneumatically to normal position after the strain is removed, the pressure fluid within the cylinder 7 expanding to move the piston 9 downwardly, and the pressure fluid flowing from the reservoir 18 back into the cylinders 8 to help move the pistons and cylinders downwardly and upwardly, relatively. The pressure fluid can also flow from the reservoir 18 into the cylinders, to compensate for leakage past the pistons, and thus maintain the desired pressure in the cylinders, air being admitted into the reservoir 18, as needed, by opening the valve 24 from time to time, or a steady stream of air can be provided. Should the rear wheels 5 strike an obstruction, tending to raise them, this will raise the rear arms and lower the forward arms of levers 14, thereby lowering the rear arms and raising the forward arms of levers 16, thus swinging the levers 13 upwardly and raising the pistons, which movement of the piston resists and cushions such movements of the parts. When both the front and rear wheels strike obstructions, the cushioning action is amplified, the forward ends of levers 13 not only being raised by the front wheels, but the rear ends of said levers also being raised by the levers 16. Furthermore, the device at each side of the vehicle can operate independent of the device at the other side, when a wheel or the wheels at one side only strike obstructions. A single pneumatic cushion or dash pot at each side suffices for both the front and rear wheels, as illustrated, and the forward and rear portions of the frame are sustained pneumatically nevertheless.

It will be noted that that portion of each lever 16 which extends below and contacts with the lever 15 is rounded, whereby the bearing point will change to thereby vary the ratio of leverage as the weight imposed on the rear end of the chassis varies. Thus, the greater the weight on the rear end of the frame 1, the more will the lever 14 be depressed, thereby raising the forward end of the lever 16 and bringing the point of contact between the levers 15 and 16 farther from the fulcrum of the lever 16. In this manner, the change in weight carried by the rear end of the frame automatically changes the leverage accordingly.

Having thus described the invention, what is claimed as new is:

The combination with a vehicle including a frame and a running gear having front and rear axles, of a lever having one end connected to one axle, a cushion carried by the frame connected to said lever between its ends, a floating lever pivotally connected between its ends with the frame and having one end cooperable with the other end of the first mentioned lever, and a third lever fulcrumed between its ends to the frame and having one end connected to the other end of the floating lever and its other end connected to the other axle.

In testimony that I claim the foregoing as my own, I have hereto affixed my signature in the presence of two witnesses.

WILLIAM H. BATES.

Witnesses:
WM. C. BATES,
L. M. BURNETT.